United States Patent [19]

Eibensteiner

[11] 3,797,036

[45] Mar. 12, 1974

[54] RECORDING AND/OR PLAYBACK APPARATUS AND CARTRIDGE FOR SUCH APPARARUS

[75] Inventor: Walter Eibensteiner, Vienna, Austria

[73] Assignee: U.S. Phillips Corporation, New York, N.Y.

[22] Filed: Nov. 3, 1971

[21] Appl. No.: 195,322

[30] Foreign Application Priority Data

| | | |
|---|---|---|
| Nov. 13, 1970 | Austria | 10234/70 |
| Apr. 9, 1971 | Austria | 3052/71 |

[52] U.S. Cl. .................... 360/85, 360/95, 242/199
[51] Int. Cl. .................... G11b 15/66, G11b 23/04
[58] Field of Search .............. 179/100.2 Z, 100.2 T; 274/4 C, 4 E; 242/55, 19 A, 197, 199; 226/49; 35/35 C

[56] References Cited

UNITED STATES PATENTS

| | | | |
|---|---|---|---|
| 3,678,213 | 7/1972 | Sato | 179/100.2 ZA |
| 3,674,942 | 7/1972 | Sugaya | 179/100.2 ZA |
| 3,643,038 | 2/1972 | Sato | 179/100.2 T |
| 3,647,984 | 3/1972 | Watanabe | 179/100.2 Z |
| 3,512,694 | 5/1970 | Sugaya | 179/100.2 Z |
| 3,660,615 | 5/1972 | Kanamaru | 179/100.2 Z |
| 3,660,614 | 5/1972 | Swain et al. | 179/100.2 Z |
| 3,665,120 | 5/1972 | Larkin | 179/100.2 Z |
| 3,665,114 | 5/1972 | Hathaway | 179/100.2 T |

FOREIGN PATENTS OR APPLICATIONS

| | | | |
|---|---|---|---|
| 1,537,240 | 10/1969 | Germany | 179/100.2 T |

OTHER PUBLICATIONS

Automatic Tape Threading, Johnson et al., IBM Technical Disclosure Bulletin, Vol. 9, No. 8, 1967

*Primary Examiner*—Vincent P. Canney
*Assistant Examiner*—Alfred H. Eddleman
*Attorney, Agent, or Firm*—Frank R. Trifari

[57] ABSTRACT

An apparatus for recording and/or playing back signals having a wide frequency spectrum on and/or from a tape-shaped record carrier such as video tape for video recording in combination with a video tape cartridge which accommodates said tape carrier. The apparatus has a deck for supporting the cartridge and a cylindrical drum about which said tape is to be wound so as to be engaged by transducer means associated with said drum. The cartridge is provided with at least one guide roller from which a portion of the tape extends in a straight line between said guide roller and said drum. Cartridge positioning means are provided whereby cooperating positioning elements located on the deck and on the cartridge engage so that the cartridge is positioned in a predetermined location on the deck with respect to the drum so that the position of said roller is accurately determined in order to determine the angle of wrap of said tape about said drum. The positioning means are in the area of the guide roller and may take the form of a pin-and-hole connection coaxially arranged with the axis of the guide roller.

4 Claims, 9 Drawing Figures

Figure 1:
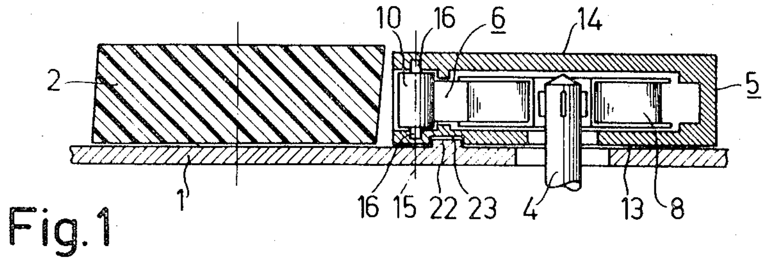

INVENTOR.
WALTER EIBENSTEINER
BY
[signature]
Agent

INVENTOR.
WALTER EIBENSTEINER
BY
[signature]
Agent

INVENTOR.
WALTER EIBENSTEINER
BY
Agent

RECORDING AND/OR PLAYBACK APPARATUS AND CARTRIDGE FOR SUCH APPARARUS

The invention relates to a recording and/or playback apparatus, in particular for signals having a wide frequency spectrum, on or from a tape-shaped record carrier accommodated in a cartridge. The record carrier may be wound externally of the cartridge along a helical path around the cylindrical outer surface of a drum when the cartridge has been placed on the apparatus. The cartridge is provided with at least one roller for guiding the record carrier, which roller is rotatable about an axis and from which part of the record carrier extends straight to the cylindrical outer surface of the drum. The invention further relates to a cartridge for use in such an apparatus.

The invention is based on the recognition that in an apparatus of the above mentioned type it is of particular importance that the pre-determined position of the cartridge on the apparatus and hence the position of the guide roller relative to the drum should be accurately maintained. Since one part of the record carrier extends straight from the guide roller to the cylindrical surface of the drum the position of the guide roller is one of the factors determining the angle through which the record carrier is wrapped round this cylindrical surface. This wrapping angle must be maintained within comparatively narrow limits, because in conjunction with the remainder of the drum construction it determines the length of the tracks on the record carrier in which the information is stored. Consequently in known arrangements the tolerances of the cartridge and of the components of the apparatus which jointly determine the position of the guide roller relative to the drum have to satisfy particular requirements.

It is an object of the invention to position the cartridge on an apparatus of the type specified hereinbefore so as to produce an exact positioning of the guide roller relative to the drum regardless of tolerances of the cartridge. According to the invention this is achieved in that in positioning means are provided on both the apparatus and on the cartridge in order to determine the position of the cartridge on the apparatus and the position of the guide roller relative to the drum. The means cooperate by their shapes, the positioning means provided on the cartridge being located in the region of the axis of the guide roller. The size of the region around the axis of the guide roller within which the positioning means provided on the cartridge may be located depends upon the requirements to be satisfied by the exactness with which the wrapping angle of the record carrier around the drum is to be maintained and upon the tolerances of the cartridge and of the apparatus, and can be determined by the designer in each particular case. It is to be regarded as the essential idea of the invention that the positioning means are appropriately located near the axis of the guide roller so as to ensure that the position of this roller is determined as accurately as possible.

It has been found to be advantageous for the positioning means on the apparatus and on the cartridge to be in the form of a pin-hole connection, the pin and the hole having cross-sections such that the pin fits in the hole so as to prevent relative rotation. In this case the cartridge is deprived of both degrees of freedom in respect of motion in the bearing plane, although this requires an increase in the complexity of the positioning means.

For this reason it has been found to be particularly advantageous for the positioning means on the apparatus and on the cartridge to be in the form of a pinhole connection in which the pin and the hole are circular in section, whilst additional, cooperating locking means for preventing rotation of the cartridge are provided on the apparatus and on the cartridge. In this embodiment the positioning means are of simple construction, and when the cartridge is rotated about the positioning means the guide roller substantially does not change position, so that the locking means for preventing rotation may also be of simple structure. In this connection it has further proved advantageous for the positioning means on the apparatus to be in the form of a recess and the positioning means on the cartridge to be in the form of a coaxial projection aligned with the axis of the guide roller. The arrangement of the positioning means on the cartridge coaxial with the axis of the guide roller entirely precludes any influence of a rotation of the cartridge on the wrapping angle. The fact that the positioning means is in the form of a projection on the cartridge permits a very simple manufacture. It is particularly advantageous for the projection to be in the form of a stub axle which protrudes from the cartridge and on the main part of which the guide roller is rotatably mounted, because this configuration enables the guide roller to be positioned with a high degree of accuracy, since the cartridge itself exerts no influence at all.

Advantageously the apparatus is provided with three separate support surfaces for the cartridge. The dimensions of the support surfaces are small compared with the dimensions of a major surface of the cartridge. One of said surfaces supports a cartridge which has been placed on the apparatus in the region of the guide roller. This ensures that the position of the cartridge relative to a reference surface is determined by a bearing surface, in addition to the positioning of the cartridge relative to the apparatus by the positioning means.

It has further been found to be advantageous to provide means for vertical guiding of the record carrier on the cylindrical surface of the drum, and on the apparatus. The means on the apparatus are adapted to be introduced into the cartridge through an opening formed in the cartridge beside the guide roller so as to engage that part of the record carrier which extends towards the guide roller. In addition, the guide roller is mounted so as to be axially displaceable and by means of a flange with which it is provided causing the record carrier to engage both vertical guides with one edge under the influence of the weight of the roller. Thus the guide roller causes the record carrier to exactly engage the vertical guides.

A further embodiment of an apparatus according to the invention is characterized in that the positioning means on the apparatus is in the form of a pin the free end of which has a cylindrical projection, and the positioning means on the cartridge is in the form of an opening in a major surface of same. The guide roller is disposed in the cartridge in the region of the opening and is displaceable with some play at right angles to its axis. It is further formed with an axial bore which is accessible through the opening in the major surface of the cartridge. The bore cooperates with the cylindrical projection of the pin, which projection is in the form of a stub axle for rotatably supporting the guide roller. Thus extremely stable positioning of a cartridge on the apparatus is obtained and also the position of the guide roller in the cartridge, and hence relative to the drum, is exactly determined, since the only decisive factors in this respect are means provided on the apparatus.

In this embodiment it was found to be of advantage for the guide roller in the cartridge to be axially displaceable with some play and for the bore to be provided with an axial closure element which, when the cartridge has been placed on the apparatus, bears on the free end of the cylindrical projection. Thus the vertical position of the guide roller relative to the drum is definitely determined by means provided on the apparatus.

It has proved to be particularly advantageous for the pin provided on the apparatus and the opening formed in the major surface of the cartridge to be of circular section and for the cylindrical projection to be coaxially provided on the pin. Cooperating positioning means are provided on the apparatus and on the cartridge to prevent rotation of the cartridge, for in this arrangement rotation of the cartridge about the pin does not change the position of the guide roller.

The invention further relates to a cartridge for use in apparatus of the above-mentioned type.

This cartridge is of the type having a cut-away portion which extends from a lateral surface into two major surfaces. The record carrier is guided across this cut-away portion by two guide rollers which are arranged in the cartridge each on one side of the cut-away portion and are mounted for rotation about an axis. According to the invention such a cartridge is characterized in that a positioning means is provided in the region of the axis of one guide roller. A particularly advantageous and simply manufacturable construction of such a cartridge is obtained when the positioning means takes the form of a projection which protrudes from one major surface of the cartridge and is co-axial with the axis of the said one guide roller. To protect such a positioning means on the cartridge against damage and deformation it has been found advantageous for said major surface to be recessed in the region of the projection, the projection being shorter than the depth of the recess. With a view to a particularly high accuracy of the positioning of the guide roller it is particularly advantageous for the projection to be a part of a fixed axle on which the guide roller associated with the projection is rotatably mounted, since in this case the tolerances of the cartridge itself are entirely insignificant. In this connection the guide roller is advantageously flanged at at least one end and is axially displaceably mounted on the axle, because in this case the roller may also be used for guiding the record carrier in a direction at right angles to the longitudinal axis of the carrier.

A further embodiment of a cartridge according to the invention is characterized in that the positioning means is formed by an opening in a major surface of the cartridge the one guide roller being mounted in the cartridge in the region of this opening. The guide roller is displaceable with some play in directions at right angles to its axis and is provided with an axial bore which is accessible through the opening formed in the major surface of the cartridge.

In this connection it has further been found to be of advantage for the said guide roller in the cartridge to be axially displaceable with some play and for the bore to be provided with an axial closure element. With a view to particularly satisfactory running properties of the guide roller on a stub axle it has proved to be advantageous for the axial closure element of the bore in the guide roller to be in the form of a ball inserted in this bore.

To ensure trouble-free placement of the cartridge on the apparatus it has proved of advantage for the opening in the major surface of the cartridge and the bore in the guide roller to be provided with increased-diameter funnel-shaped portions directed towards the exterior of the major surface of the cartridge.

Figure 2:
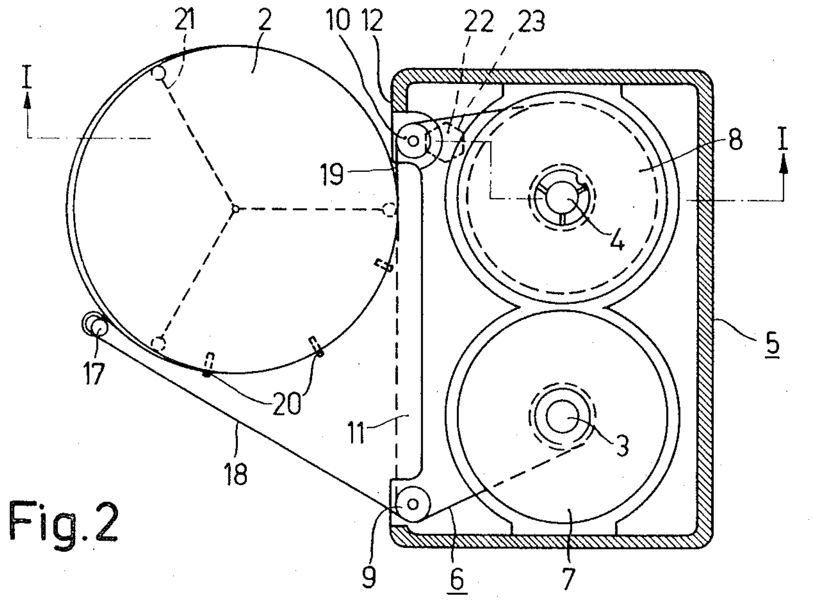
Figure 3:
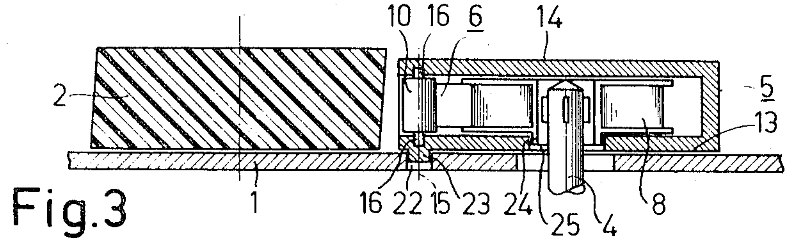
Figure 4:
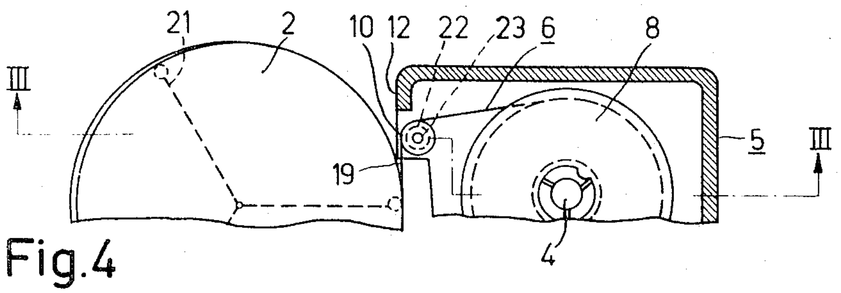
Figure 5:
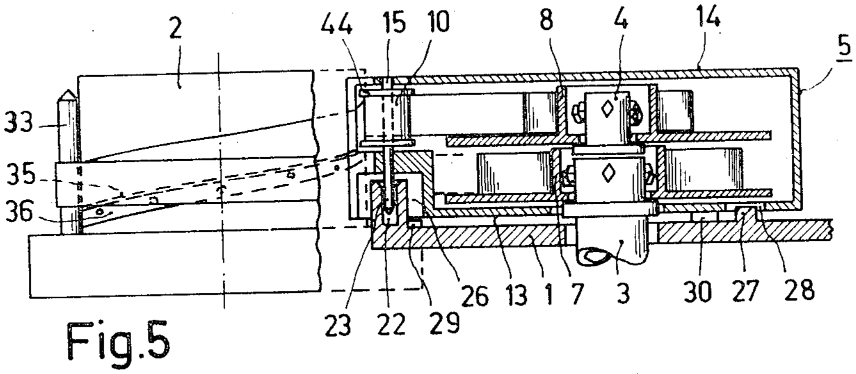
Figure 6:
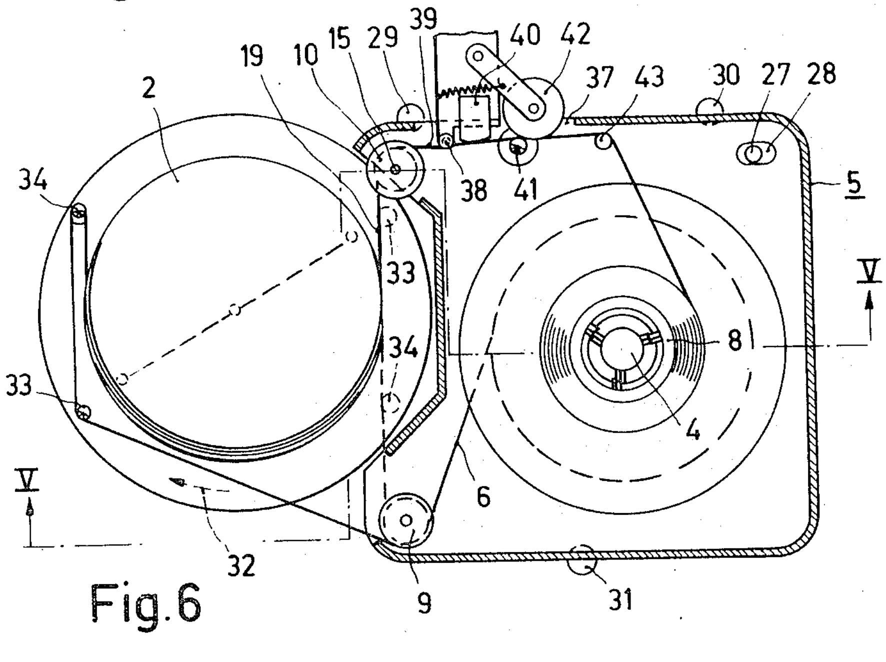
Figure 7:
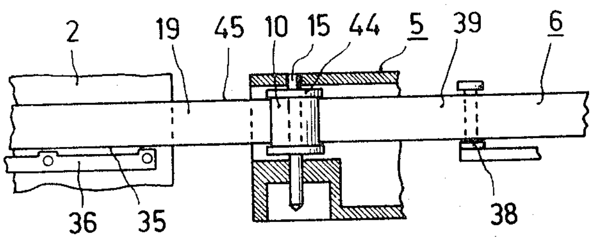
Figure 8:
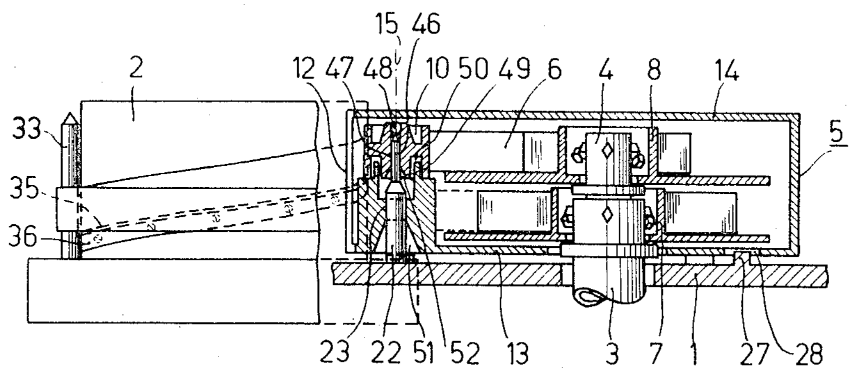
Figure 9:
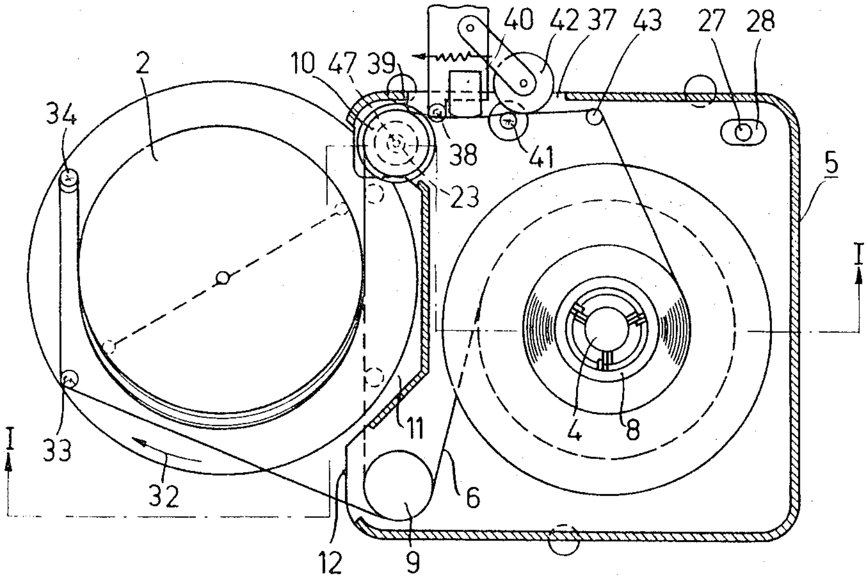

Embodiments of the invention will now be described by way of non-limitative examples, with reference to the accompanying diagrammatic drawings, in which:

FIG. 1 is a longitudinal sectional view of an embodiment in which positioning means also serve to lock a cartridge against rotation, FIG. 2 is a top plan view of this embodiment, FIG. 3 is a longitudinal sectional view of an embodiment provided with positioning means in the form of a pin-hole connection, both the pin and the hole having a circular section, FIG. 4 is a top plan view of this embodiment, FIG. 5 is a longitudinal sectional view of an embodiment in which the axle of a guide roller serves as a positioning means on a cartridge, FIG. 6 is a top plan view of this embodiment, FIG. 7 shows schematically the manner in which in the embodiment shown in FIGS. 5 and 6 the record carrier is made to engage its vertical guides by means of the guide roller, FIG. 8 is a longitudinal sectional view of another embodiment in which a pin provided with a cylindrical projection and mounted on the apparatus serves to position a cartridge and a guide roller, and FIG. 9 is a top plan view of this embodiment.

Referring now to FIG. 1, reference numeral 1 designates a deck of a recording and/or playback apparatus, on which deck a drum 2 is arranged and from which two winding spindles 3 and 4 protrude. On the deck 1 there may be placed a cartridge 5 which contains a tape-shaped record carrier 6 which passes from a first spool 7 to a second spool 8 over guide rollers 9 and 10 which are disposed one on each side of a cut-away portion 11 of the cartridge. This portion 11 extends from a lateral surface 12 of the cartridge into its two major surfaces 13 and 14. The guide rollers 9 and 10 are each mounted in the cartridge so as to be rotatable about an axis 15, for which purpose they are provided with stub axles 16, which are journalled in corresponding recesses in the two major walls 13 and 14 of the cartridge. Thus the record carrier follows a path across the cut-away portion 11 which is indicated by a broken line in FIG. 2. When the cartridge has been placed on the deck 1 the spindles 3 and 4 are coupled with the spools 7 and 8 respectively.

The part of the record carrier in the cut-away portion may be grasped, for example manually, and be wrapped in a helical path around the cylindrical surface of the drum 2 and a guide stud 17 provided on the apparatus, so that the record carrier is wound around the drum through a pre-determined angle. A part 18 of the record carrier extends from the guide roller 9 over the guide stud 17 to the drum 2, whilst another part 19 extends straight between the guide roller 10 and the drum. Along the cylindrical surface of the drum vertical guides 20 are provided which are capable of defining the path of the record carrier either along one edge or along both edges. Within the wrapping region the record carrier cooperates with a rotating magnetic-head arrangement 21 which scans the record carrier along oblique tracks. In the embodiment shown the wrapping angle is 120° and the magnetic-head arrangement comprises three heads mutually displaced by 120°, so that the successive heads each describe an oblique track which extends from one edge of the record carrier to the other edge. The wrapping angle must be exactly maintained to ensure that the head should scan the tracks on the record carrier along the desired length and in the desired sequence. This wrapping angle is determined by the positions of the guide stud 17 and the guide roller 10 relative to the drum 2. Since the drum 2 and the guide stud 17 form part of the apparatus, their relative positions may readily be accurately fixed. The guide roller 10, however, forms part of the cartridge 5 which can be placed on the apparatus and removed from it, so that the position of this roller relative to the drum cannot simply be accurately defined.

According to the invention, in order to define the position of the cartridge on the apparatus and the position of the guide roller 10 relative to the drum 2, positioning means 22 and 23 are provided on the deck 1 and on a major surface 13 of the cartridge, which means cooperate with one another by their shapes, the positioning means 23 being arranged on the cartridge in the region of the axis 15 of the guide roller 10. The two positioning means comprise a pin-hole connection, the positioning means 22 taking the form of a pin protruding from the deck 1 and the positioning means 23 taking the form of a hole, in the present case a blind hole, in the major surface 13 of the cartridge. The cross-sections of the pin and of the hole are such that the pin fits in the hole so as to be blocked against rotation, for which purpose, as FIG. 2 shows, it has a hexagonal section. This ensures that when the cartridge is placed on the apparatus so that the positioning means 22 and 23 engage one another the position of the cartridge on the apparatus is fixed and the cartridge is no longer movable in the plane of the supporting surface. As a result the position of the guide roller 10 in the cartridge relative to the drum 2 is also determined. Since the positioning means are arranged in the region of the axis 15 of the guide roller 10, tolerances to which the cartridge may be subject and which, for example, in cartridges made of synthetic materials may be comparatively large in respect of the overall dimensions relative to the principal plane, are substantially insignificant for the position of the guide roller relative to the drum. This ensures that the desired wrapping angle of the record carrier around the cylindrical surface of the drum is exactly maintained.

The size of the region around the axis of the guide roller within which the positioning means provided on the cartridge may be located follows from the consideration of what deviations are permissible for the wrapping angle and to what tolerances the cartridge construction in conjunction with the tolerances for the positioning means is subject. In practice it has been found that if the wrapping angle is to be exact to 3 minutes the position of the axis of the guide roller must be fixed with an accuracy of 0.1 mm, for which purpose the positioning means on the cartridge may be located within a circle of radius about 10 mm around the axis of the guide roller. Obviously, the conditions will be beneficially affected in proportion as the spacing between the positioning means 23 and the axis of the guide roller is reduced; however, this reduction may be restricted for reasons of space. As will be clear from the above, the respective region within which the positioning means on the cartridge is to be located may be determined in each separate case by the designer.

With respect to the cross-section of the pin-hole connection it should be noted that this may have any of a large number of forms, including forms which enable the cartridge to be placed on the apparatus in a single position only, as is the case, for example when the cross-sections have the form of segments of a circle.

In the embodiment shown in FIGS. 3 and 4 the positioning means 22 on the deck of the apparatus and 23 on the cartridge, have the form of a pin-hole connection with circular cross-section, a hole 22 being provided in the deck of the apparatus and a pin 23 being arranged in the shape of a projection on the major surface 13 of the cartridge. This construction is particularly simple from the point of view of manufacturing technology, because it is easy to make holes in sheet metal parts and to make projections on synthetic material component parts as generally used for apparatus walls and cartridges respectively. Furthermore this construction is highly advantageous with respect to the space required.

Since the circular cross-section of the pin-hole connection permits the cartridge to be rotated in the plane of the supporting surface about the projection 23, cooperating positioning means for locking the cartridge against rotation are provided on the apparatus and on the cartridge. In the embodiment shown these means are simply constituted by the winding spindles 3 and 4 which engage in the spools 7 and 8 respectively, the spools being centered by projections 23 in holes 25 in the major surface 13 of the cartridge.

In this embodiment the projection 23 is aligned with the axis 15 of the guide roller 10 so as to be coaxial with the axis. As has been mentioned hereinbefore, this results in highly accurate positioning of the guide roller, especially because a possible rotation of the cartridge about the projection 23 does not entail a change in position of the guide roller.

In the embodiment shown in FIGS. 5 and 6 the positioning means 23 on the cartridge is directly constituted by a stud of the axle 15 of the guide roller 10 which protrudes from the surface 13 of the cartridge. The axle is rigidly secured to the cartridge and the guide roller is mounted for rotation on the axle. The major surface 13 of the cartridge is provided in the region of the positioning means 23 with a recess 26 the depth of which is greater than the length of the stud axle 15 protruding from the cartridge, so that this stud is protected against deformation when the cartridge has been removed from the apparatus. The positioning means 22 on the deck 1 of the apparatus is in the form of a sleeve which when the cartridge has been placed on the apparatus projects into the recess 26, enabling the stud 23 to engage in the hole 22. Because in this embodiment part of the axle of the guide roller is directly used as a positioning means on the cartridge, the guide roller will be positioned with a high degree of accuracy.

The positioning means provided on the apparatus for locking the cartridge against rotation in this embodiment takes the form of a stud 27 on the deck 1 which engages in a slot 28 formed in the surface 13 of the cartridge. Because rotation of the cartridge about the axle 15 does not change the position of the guide roller 10, these locking means need not satisfy stringent requirements of accuracy. Hence there are several other possibilities of obtaining such locking of the cartridge against rotation, for example by bending parts from the apparatus deck which serve as abutments for at least one minor surface of the cartridge.

On the surface 1 of the apparatus there are provided three separate projections 29, 30 and 31 which act as supports for the cartridge. The size of each support is small compared with the size of the major surface 13 of the cartridge. The support 29 is arranged so that when the cartridge has been placed on the apparatus it is supported in the region of the guide roller 10. The cartridge is advantageously supported by all three supports near its edges. Thus the position of the cartridge on the apparatus, which position is determined by the positioning means 22 and 23, is also defined with respect to the support of the major surface 13 of the cartridge on the apparatus.

When the cartridge has been placed on the apparatus the record carrier is in the position shown in broken lines in FIG. 6, i.e., it extends across the cut-away portion 11 in the cartridge. In order to loop the record carrier around the cylindrical surface of the drum, in this embodiment there is provided a device which is adapted to be rotated around the drum 2 in the direction indicated by the arrow 32. This device engages the record carrier with two guide studs 33 and 34 and wraps it around the drum through an angle of 180°, which situation is shown in FIGS. 5 and 6. Along the cylindrical surface of the drum one edge 35 of the record carrier is vertically guided by a strip-shaped guide element 36 provided on this cylindrical surface. Furthermore, when the cartridge has been placed on the apparatus a vertical guide 38 for the record carrier can be introduced into an opening 37 formed in the cartridge (FIG. 6) and this guide guides the part 39 of the record carrier along the same edge 35 as does the guide element 36, the part 39 extending in a direction towards the guide roller 10 and thus opposite to that extending from said guide roller to the drum. This part 39 is further guided past a magnetic head 40 for recording and/or playing back sound and/or synchronizing signals, then passes between a capstan 41 and a pressure roller 42 which co-operates with the capstan to drive the record carrier and finally, by way of a further guide roller 43, reaches the spool 8 (FIG. 6).

The guide roller 10 is axially displaceably mounted on the axle 15 and is provided with at least one flange 44 which extends along an edge 45 of the record carrier on the side opposite to the edge 35 which is guided by the elements 36 and 38, as is shown diagrammatically in FIG. 7. The weight of the guide roller 10 is made such that it thrusts the record carrier along one edge against both vertical guides 36 and 38 without, however, curving it in a direction at right angles to its length. Thus the path of the record carrier is determined with particular accuracy.

In the inoperative condition, with the record carrier not tensioned, the guide roller 10 will assume its deepest possible position as a result of to its weight, with the result that the major surface of the record carrier may come to rest on the flange 44. However, as soon as the record carrier is moved the reaction forces which act on the axially displaceable guide roller will raise the latter to an extent such that the flange engages the edge 45 of the record carrier again, ensuring that in operation the record carrier will always be vertically guided accurately.

The positioning means 22 and 23 may obviously be constructed in other manners than those described.

FIGS. 8 and 9 show another embodiment.

In this embodiment, there are provided for determining the position of the cartridge on the apparatus a positioning means 22 on the apparatus deck 1 and a positioning means 23 on the major surface of the cartridge, which means co-operate with one another by reason of their shapes, the positioning means 23 on the cartridge being again located in the region of the axle 15 of the guide roller, however, the two positioning means comprise a pin-hole connection of circular section, the positioning means 22 being in the form of a pin protruding from the apparatus deck 1, and the positioning means 23 being in the form of a corresponding opening in the major surface 13 of the cartridge. To determine the position of the guide roller 10 relative to the drum 2 the pin 22 rigidly secured to the apparatus is provided at its free end with a coaxial cylindrical projection 46. The guide roller 10, which is mounted in the cartridge in the region of the opening 23 in the major surface 13 so as to be displaceable at right angles to its axis 15 with some play, is provided with an axial bore 47 which is accessible through the opening 23 in the major surface 13 of the cartridge and is intended to cooperate with the cylindrical projection 46 of the pin 22, which projection takes the form of a stub axle for rotatably supporting the guide roller. Again, positioning means are provided to lock the cartridge against rotation, for which purpose there is provided on the apparatus deck 1 a pin 27 which engages in a slot 28 in the major surface 13 of the cartridge. Since rotation of the cartridge about the pin 22 does not cause a change in the position of the guide roller 10, the positioning means need not satisfy exacting accuracy requirements.

This ensures that when the cartridge is placed on the apparatus, in which process on the one hand the positioning means 22 and 23 and also the positioning means 27 and 28 and on the other hand the cylindrical projection 46 and the bore 47 engage one another, the position of the cartridge on the apparatus and the position of the guide roller 10 relative to the drum 2 are exactly determined. The positioning means 27 and 28 prevent movement of the cartridge in the supporting plane. Since the positioning means are disposed in the region of the axle 15 of the guide roller 10 and the position of the guide roller is defined by a projection of the cartridge positioning means provided on the apparatus, any tolerances of the cartridge are no longer of significance to the position of the guide roller relative to the drum. However, this ensures that the desired wrapping angle of the record carrier around the cylindrical surface of the drum will always be accurately obtained.

Regarding the cross-sections of the positioning means 22 and 23, it should be noted that, as has already been stated hereinbefore, many shapes are possible, for example also such which allow the placing of a cartridge on the apparatus in only one position, as is the case, for example, when the cross-sections are in the forms of segment of a circle, in which case the positioning means 27 and 28 for locking the cartridge against rotation may be dispensed with.

In the embodiment shown in FIGS. 8 and 9 the guide roller 10 in the cartridge is axially displaceable with some play, and the bore 47 is provided with an axial closure element in the form of a ball 48 inserted in it, which when the cartridge is placed on the apparatus bears on the free end of the cylindrical projection 46. Thus the vertical position of the guide roller relative to the drum is also determined. The ball 48 ensures satisfactory rotation of the guide roller about the cylindrical projection 46.

To limit the play of the guide roller with regard to its displaceability at right angles to its axis 15 when the cartridge is not in its place on the apparatus, the major surface 13 of the cartridge is formed with an annular rim 49 directed towards the interior of the cartridge, on which rim the guide roller 10 may be placed with a corresponding annular recess 50. The play in regard of the axial displaceability of the guide roller 10 is defined by the spacing between the two major surfaces 13 and 14 at the respective area of the cartridge, which play is made small enough to prevent the guide roller from disengaging from the annular rim 49. To ensure that the cartridge will be correctly placed on the apparatus. The openings 23 in the major surface 13 of the cartridge and the bore 47 in the guide roller 10 are provided with funnel-shaped increased-diameter portions 51 and 52 respectively directed towards the exterior of the major surface of the cartridge.

If required, the guide roller 9 also may be positioned similarly to the guide roller 10 by a pin provided on the apparatus, but in this case obviously no further positioning of the cartridge itself in the region of this guide roller is permitted, to prevent the position of the cartridge from being excessively determined.

What is claimed is:

1. A tape cartridge for carrying a tape-shaped record carrier for recording and/or reproducing signals having a wide frequency spectrum comprising a casing having two substantially parallel major surfaces and a plurality of lateral surfaces joining said major surfaces, means for supporting said tape within said casing, a cut-away portion in said casing extending from one of said lateral surfaces inwards along said major surfaces, a pair of guide rollers rotatably mounted within said cartridge each on one side of said cut-away portion, an opening in one of said major surfaces aligned with the axis of one of said rollers, and an axial bore provided in said roller aligned with said opening so as to be accessible through said opening for receiving positioning means provided on an apparatus which accommodates said cartridge, said guide roller having said bore being mounted for floating movement in the axial direction and in directions at right angles to its axis of rotation, a ball carried within said bore for axially closing said bore, said opening in the major surface of said cartridge and the bore in said guide roller being provided with increasing diameter funnel shaped portions directed toward the exterior of the major surface of said cartridge so as to provide a guideway for reception of said projection means.

2. An apparatus for recording and/or playing back signals having a wide frequency spectrum on/and or from a tape-shaped record carrier in combination with a tape-cartridge for accommodating said record carrier comprising a deck surface for supporting said cartridge, a cylindrical drum carried on said apparatus, transducer means associated with said drum, means for wrapping said tape carried within said cartridge externally of said cartridge in a helical path about the outer cylindrical surface of said drum when said cartridge is in a predetermined position on said deck with respect to said drum so as to properly determine the angle of wrap of said tape about said drum, at least one guide roller rotatably mounted within said cartridge for guiding said tape externally of said cartridge when said tape is wrapped about said drum so that a portion of said tape extends in a straight path directly between said drum and said guide roller, and positioning means for accurately determining the position of said guide roller with respect to said drum so as to determine said angle of wrap, said positioning means comprising a substantially circular pin carried by said apparatus extending from said deck, a cylindrical projection carried on the free end of said pin, an opening located in a major surface of said cartridge, an axial bore provided through one of said guide rollers aligned with said opening for receiving said cylindrical projection of said pin and upon which said guide roller is rotatably supported, said guide roller having said bore being displaceable in a direction at right angles to its axis so as to provide some lateral play, and a ball carried within said bore for axially closing said bore.

3. The apparatus according to claim 2 further comprising means carried on said drum for vertically guiding said record carrier, displaceable means carried by said apparatus for vertically guiding said tape-shaped record carrier, and means carried by said apparatus for engaging said tape within said cartridge through an opening in said cartridge for wrapping said tape about said drum, said guide roller having said bore being mounted so as to be axially displaceable and further comprising a flange carried by said roller for causing the record carrier to engage said vertical guides on said apparatus and on said drum.

4. In an apparatus for recording and/or playing back signals having a wide frequency spectrum on and/or from a tape shaped record carrier, the combination with a tape cartridge accommodating said record carrier comprising a deck surface for supporting said cartridge, a cylindrical drum supported on said surface at least one guide roller rotably mounted within said cartridge for rotation about an axis for guiding said tape-shaped record carrier, means for engaging and winding said tape externally of said cartridge in a helical path about the outer surface of said cylindrical drum when said cartridge is placed on said surface in a predetermined position with respect to said drum, a portion of said tape-shaped record carrier extending in a straight path directly between said drum and said guide roller when said tape is wound about said drum, the angle of wrap of said tape about said drum thereby being determined by the position of said guide roller, a substantially circular pin carried by said apparatus having a cylindrical projection coaxially arranged on said pin extending from said deck surface, a substantially circular opening in a major surface of said cartridge for receiving said pin, an axial bore extending through said guide roller and aligned with said opening in said cartridge surface, said bore of said roller cooperating with the cylindrical projection of said pin rotatable thereabout for positioning said cartridge on said surface so as to accurately determine the position of said guide roller with respect to said drum thereby determining the angle of wrap of said tape about said drum, said guide roller being mounted within said cartridge so as to permit movement thereof in the axial direction permitting some play when the cartridge is placed on the apparatus with said projection received within said bore, a closure element carried within said bore which bears on the free end of said cylindrical projection, and rotation prevention means carried on the surface of said apparatus for engaging said cartridge so as to prevent rotational movement thereof.

* * * * *

PO-1050
(5/69)

UNITED STATES PATENT OFFICE
CERTIFICATE OF CORRECTION

Patent No. 3,797,036 Dated March 12, 1974

Inventor(s) WALTER EIBENSTEINER

It is certified that error appears in the above-identified patent and that said Letters Patent are hereby corrected as shown below:

In the heading:

In the title: "Appararus" should be --Apparatus--

Assignee: "U.S. Phillips" should be --U.S. Philips--

Under "Priority Data" "10234/70" should be --A 10234/70--
"3052/71" should be --A 3052/71--

Column 1, line 42, cancel "in" (second occurrence)

Signed and sealed this 19th day of November 1974.

(SEAL)
Attest:

McCOY M. GIBSON JR.
Attesting Officer

C. MARSHALL DANN
Commissioner of Patents